O. SCHÖNHERR & J. HESSBERGER.
PRODUCTION OF LONG STABLE ELECTRIC ARCS.
APPLICATION FILED JAN. 10, 1907.
976,002.
Patented Nov. 15, 1910.
2 SHEETS—SHEET 2.
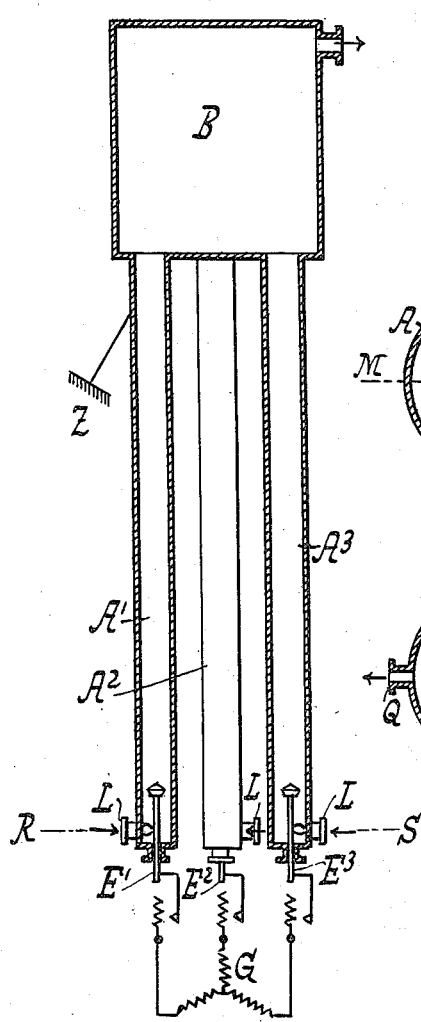
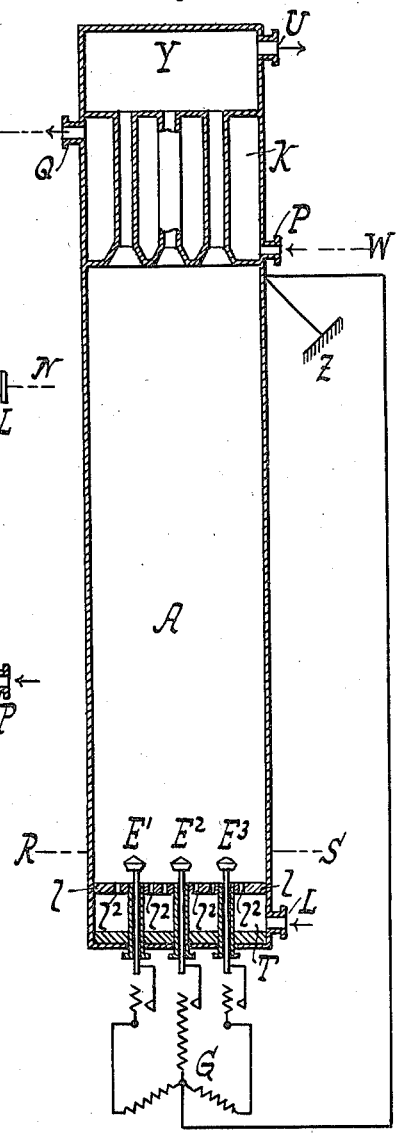
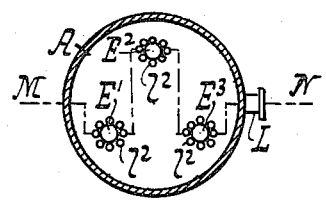
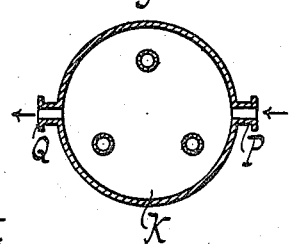
Witnesses:
William Miller
Christian Almstaedt
Inventors
Otto Schönherr
Johannes Hessberger
By their Attorney
W. C. Hauff

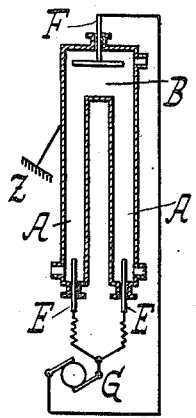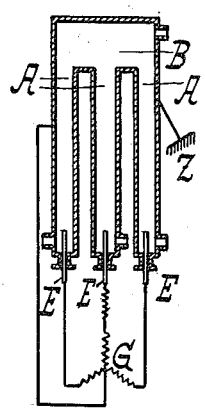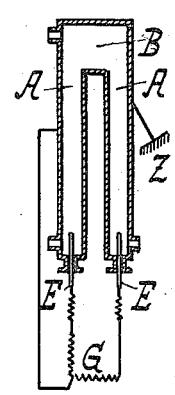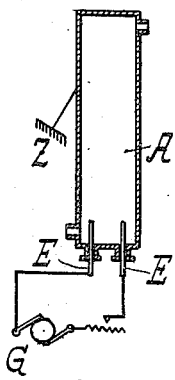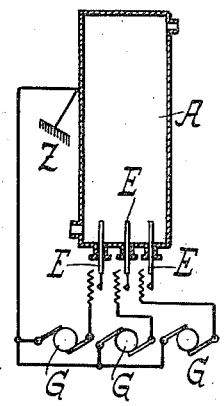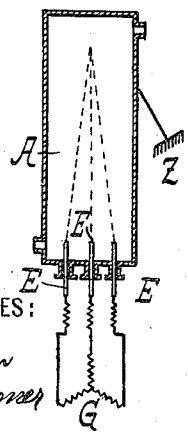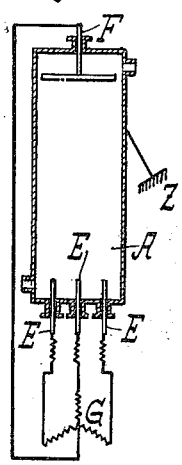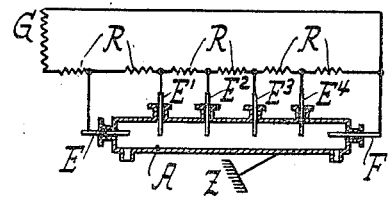

UNITED STATES PATENT OFFICE.

OTTO SCHÖNHERR AND JOHANNES HESSBERGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF LONG STABLE ELECTRIC ARCS.

976,002.

Specification of Letters Patent. Patented Nov. 15, 1910.

Application filed January 10, 1907. Serial No. 351,664.

*To all whom it may concern:*

Be it known that we, OTTO SCHÖNHERR, doctor of philosophy and chemist, subject of the King of Saxony, and JOHANNES HESS-BERGER, electrician, subject of the King of Prussia, residing at Ludwigshafen-on-the-Rhine, Germany, have invented new and useful Improvements in the Production of Long Stable Electric Arcs, of which the following is a specification.

The object of our present invention is to effect improvements in the means described and claimed in the specification of Letters Patent No. 930,238 dated August 3, 1909, for the production of long stable electric arcs, that is to say by employing an electrode connected with one pole of a source of electricity and inside and insulated from a tube, or passage, which is either connected with, or has at, or near, its other end, a second electrode connected with, the other source of electricity, and passing a current of air, or other gas, or gases, through the tube, or passage, with such velocity that a long and steadily burning arc is produced, and the improvements according to the present invention are as follows:—We have discovered that when working with two, or more, such tubes, or passages, these can be combined together in such a manner that the ends opposite to those at which the insulated electrodes are situated and from which the arcs spring are led into a common space, and it is only necessary to employ one common electrode against which the arcs strike instead of employing several single electrodes. We have further found that if the electrodes from which the arcs spring, be connected so that they form the separate phases of a polyphase system, it is unnecessary to employ the said one common electrode, as the arcs formed join one another directly in the common space. We have further discovered that several insulated electrodes from which the arcs spring can be introduced into one and the same tube, or passage, and in this way a number of long stable electric arcs can be obtained burning quietly side by side in one tube, or passage. In this case a single phase current, or single phase currents, can be used and supplied to the electrodes in parallel, but it is preferred to make use of a compensated polyphase current and to connect a separate phase thereof with each of the electrodes side by side in one tube, or passage, as we have found that the arcs when established do not in this case take the shortest route by discharging directly between the electrodes, but that, even when no electrode against which the arcs might strike is employed, long stable electric arcs side by side are obtained if air, or other gas, or gases, be blown through the tube, or passage, as described in the aforesaid specification, except that in this case it is preferred to pass the air, or gas, or gases, into the tube, or passage, without any whirling motion.

In the apparatus employed by us for carrying out this invention the insulated electrodes are at such a distance from one another and from the walls of the containing tube, or passage, that under ordinary conditions and with the comparatively low voltage used by us (for instance a few thousand volts), an electric arc will not, without assistance, spring from one electrode to another, or to the wall of the tube, or passage. The formation of the arcs, however, can be carried out for instance according to any one, or more, of the methods described in the aforesaid specification, for instance, when one common opposite electrode is employed the arc, or arcs, can, where the shape of the apparatus allows, be started by bringing this electrode into contact with, and then withdrawing it from, the insulated electrodes; or the insulated electrodes and the wall of the tube, or passage, can be short circuited by means of a piece of metal which is removed when the formation of the arcs has taken place; or, in the case where one tube, or passage, contains insulated electrodes which are not all at the same potential as one another, the arcs can be formed by short circuiting two such electrodes by means of a piece of metal which in this case also is removed when the formation of the arcs has taken place. In every case we prefer to connect electrically the tube, or passage, to earth since then there is no danger incurred by touching the tube, or passage, and we also prefer to cool the electrode or other part of the apparatus against which the arcs may strike, the cooling being carried out in any convenient manner, for instance as described in the aforesaid specification.

The accompanying diagrams illustrate examples of how our invention can be carried into effect, but our invention is not limited to the examples illustrated.

Similar letters of reference are used to denote corresponding parts in the several figures.

Figures 1 to 9 inclusive and also Fig. 11 are vertical diagrammatic sections of different forms of apparatus used when carrying out the process according to our invention, and Figs. 10 and 12 are horizontal cross-sections along the lines indicated of the apparatus illustrated in Figs. 9 and 11 respectively. Fig. 13 is also a cross-section of Fig. 11 taken along the line V W.

Fig. 1 represents an apparatus in which two tubes A A, each containing at one end thereof an insulated electrode E E, are led into a common space B which contains an electrode F. The electrodes E E are connected in parallel with one pole of the generator G, the other pole thereof, and the electrode F, and the walls of the tubes A A being in electrical connection with one another and to earth at Z. The arcs which, at their formation, spring from the insulated electrodes E E terminate in adjacent parts of the walls of the tubes A A, but under the influence of the current of air, or other gas, or gases, the terminations travel rapidly upward and finally the current passes through the electrode F.

Fig. 2 represents three tubes A A A each containing, at one end, an insulated electrode E E E, these electrodes being connected one to each pole of a three-phase system represented at G. The other ends of the tubes A A A are led into a common space B which, in this case, contains no electrode and the tubes are in electrical connection with one another and with the neutral point of the three-phase system G and to earth at Z. The arcs which at first are made to spring from the electrodes E E E directly to the walls of the tubes A A A finally under the influence of the current of air, or other gas, or gases, meet one another in the common space B.

In Fig. 3 A A represent two tubes, each containing at one end an insulated electrode E and opening at their other end into a common space B. The electrodes E E are connected one to each pole of a two-phase system G, while the neutral point thereof is in electrical connection with the walls of the tubes A A and to earth at Z.

Fig. 4 represents an arrangement in which two insulated electrodes E E (attached one to each pole of a generator G) are introduced side by side into one tube A connected to earth at Z. The arcs, which at their formation are made to spring either from the electrodes to the wall of the tube A, or from one electrode to the other, travel under the influence of the current of air, or other gas, or gases, upward and finally meet in the space at the top of the tube, or pass into the walls of the tube at, or toward, the top thereof. In this case, as in all cases where one tube, or passage, contains more than one insulated electrode, we prefer to make use of a direct, non-whirling, current of air, or other gas, or gases, and to introduce this in a manner such for instance as hereinafter described with regard to Fig. 11. If a vertical wall, or walls, be inserted in the tube A so as to make separate passages in each of which there is one insulated electrode, the said separating wall, or walls, not reaching to the upper end of the tube so as to leave there the aforesaid space, then the air, or other gas, or gases, can be introduced between the wall, or walls, with a whirling motion.

Fig. 5 represents a single tube A with three insulated electrodes E E E side by side, each of which is respectively connected with one pole of one of three generators G G G, while the other poles of these three generators are in electrical connection with one another and with the wall of the tube A and to earth at Z.

Fig. 6 represents a single tube A with three insulated electrodes E E E which are attached one to each pole of the three-phase system G. The tube A is connected to earth at Z. The arcs can at first be caused to spring from the electrodes to the adjacent wall of the tube, or from one electrode to another, the terminations, however, are driven forward, or the arcs increased, by the current of air, or other gas, or gases, and finally join one another at, or toward, the other end of the said tube A.

Fig. 7 represents an apparatus like that represented in Fig. 6, but with an electrode F introduced into and in electrical connection with the other end of the tube A which is in electrical connection both with the neutral point of the three-phase system G and to earth at Z. The arcs, when established start from the insulated electrodes E E E and terminate in the electrode F.

Fig. 8 represents an apparatus having several insulated electrodes in one tube. The tube A has an insulated electrode E at one end, $E_1$, $E_2$, $E_3$, $E_4$ represent insulated electrodes introduced into the side of the tube A, while at the other end there is a non-insulated electrode F; G represents a source of electricity, and R R represent resistance coils. The tube A is connected to earth at Z, and air, or other gas, or gases, is, or are, passed through the tube A in the direction from E to F. An arc is formed between the electrodes E and $E_1$, for instance by pushing up the electrode E until it touches the electrode $E_1$ and then withdrawing it to its original position then, owing to the difference of potential between the electrodes $E_1$ and $E_2$ in consequence of the insertion of a resistance coil R, between the said electrodes and owing to the influence of the current of hot air, or other gas, or gases, an arc springs between these electrodes $E_1$ and $E_2$. Then subsequently arcs also spring between the electrodes $E_2$ and $E_3$, between the electrodes $E_3$ and $E_4$, and finally between the electrodes $E_4$ and F. When this is the case, if the tube A be not too long, the intermediate electrodes $E_1$, $E_2$, $E_3$, and $E_4$ can, of course, be drawn back and the arc springs directly from E to F, the action then not being claimed under this application as it is the same as that described and claimed in the aforesaid specification of Letters Patent No. 930,238, dated Aug. 3, 1909. In this case the aforesaid intermediate electrodes only assist the formation or the large arc between E and F. In the apparatus represented in the said Fig. 8 the distances between the electrodes E and $E_1$, $E_1$ and $E_2$, $E_2$ and $E_3$, $E_3$ and $E_4$, $E_4$ and F, may be about two feet each.

Fig. 9 is a vertical section along the line M N, Fig. 10, and Fig. 10 is a horizontal cross-section along the line R S, Fig. 9, representing an arrangement of the apparatus having three tubes $A_1$, $A_2$, and $A_3$, each containing an insulated electrode $E_1$, $E_2$, $E_3$, leading at their other ends into a common space B. The said electrodes are connected to each pole of the three-phase system G, and the tubes $A_1$, $A_2$, and $A_3$ are connected to earth at Z. L L represent the openings through which the air, or other gas, or gases, passes, or pass, into the tubes $A_1$, $A_2$, $A_3$, in the direction indicated by the arrows so as to have the whirling motion which is preferred when each tube contains only one electrode.

Fig. 11 is a vertical section along the zigzag line M N of Fig. 12, and Figs. 12 and 13 are horizontal cross-sections on the lines R S and V W respectively of Fig. 11. These three figures represent an arrangement of the apparatus having a single tube A containing three insulated electrodes $E_1$, $E_2$, $E_3$, which are connected one with each pole of the three-phase system G; the neutral point of which system is in electrical connection with the tube A and to earth at Z. K represents a cooler situated near the top of the tube A and in electrical connection therewith; water, or other suitable cooling agent, being passed through this cooler, entering through the opening P, and leaving through the opening Q, and serving to abstract some of the heat from the gases which have been treated in the electric arcs. The air, or other gas, or gases, is, or are, passed through the opening L into the space T between the bottom plate of the tube A and the false bottom $l\,l$, and from this space, the air, or gas, or gases, passes, or pass, through the openings $l_2\,l_2$, past the electrodes $E_1$, $E_2$, $E_3$ through the cooler K, into the space Y, and out through the opening U. The course of the air is indicated by arrows as is also that of the water. The said openings $l_2\,l_2$ are shown as being straight, so that the air, or other gas, or gases, enters, or enter, the tube A with a direct, non-whirling motion.

Now what we claim is:

1. The process of producing long stable electric arcs in tubes or passages provided with insulated electrodes by passing currents of gas through the said tubes or passages and causing a plurality of arcs to terminate in a common space substantially as hereinbefore described.

2. The process of producing long stable electric arcs in tubes or passages provided with insulated electrodes by passing currents of gas through the said tubes or passages and causing a plurality of arcs to strike against a common electrode situated in a common space substantially as hereinbefore described.

3. The process of producing long stable electric arcs side by side in a tube or passage provided with insulated electrodes by passing currents of gas through the said tube or passage and causing a plurality of arcs to terminate in a common space substantially as hereinbefore described.

4. The process of producing long stable electric arcs side by side in a tube or passage provided with insulated electrodes by passing currents of gas through the said tube or passage and causing the electric arcs to strike against one common electrode substantially as hereinbefore described.

5. The process of producing long stable electric arcs in tubes or passages provided with insulated electrodes by passing currents of gas through the said tubes or passages and by connecting the electrodes from which the arcs spring each with a separate phase of a polyphase electric system and causing the arcs formed to terminate in a common space substantially as hereinbefore described.

6. The process of producing long stable electric arcs in tubes or passages provided with insulated electrodes by passing currents of gas through the said tubes or passages and by connecting the electrodes from which the arcs spring each with a separate phase of a polyphase electric system and causing the arcs formed to strike against one common electrode situated in a common space substantially as hereinbefore described.

In testimony whereof we have hereunto set our hands in the presence of two subscribing witnesses.

OTTO SCHÖNHERR.
JOHANNES HESSBERGER.

Witnesses:
ERNEST F. EHRHARDT,
J. ALEC. LLOYD.